(12) United States Patent
Otani et al.

(10) Patent No.: US 9,782,847 B2
(45) Date of Patent: Oct. 10, 2017

(54) GEAR MACHINING DEVICE

(71) Applicant: JTEKT CORPORATION, Osaka-shi (JP)

(72) Inventors: Hisashi Otani, Anjo (JP); Hiroyuki Nakano, Tokai (JP); Hideki Shibata, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 255 days.

(21) Appl. No.: 14/697,823

(22) Filed: Apr. 28, 2015

(65) Prior Publication Data

US 2015/0328704 A1 Nov. 19, 2015

(30) Foreign Application Priority Data

May 19, 2014 (JP) .................................. 2014-103598

(51) Int. Cl.
| | |
|---|---|
| *B23F 5/20* | (2006.01) |
| *B23F 21/12* | (2006.01) |
| *B23F 23/00* | (2006.01) |
| *B23F 5/16* | (2006.01) |
| *B23F 21/10* | (2006.01) |

(Continued)

(52) U.S. Cl.
CPC ............... *B23F 5/20* (2013.01); *B23F 5/16* (2013.01); *B23F 21/12* (2013.01); *B23F 23/006* (2013.01); *B23F 1/04* (2013.01); *B23F 5/163* (2013.01); *B23F 21/06* (2013.01); *B23F 21/10* (2013.01); *Y10T 409/104293* (2015.01); (Continued)

(58) Field of Classification Search
CPC . Y10T 409/103816; Y10T 409/103975; Y10T 409/104134; Y10T 409/104293; Y10T 409/105247; Y10T 409/105406; Y10T 409/105565; Y10T 409/105724; B23F 5/163; B23F 5/16; B23F 5/12; B23F 21/06; B23F 21/10; B23F 21/103; B23F 21/106; B23F 1/04
USPC ........ 407/27, 28; 409/25, 26, 27, 28, 34, 35, 409/36, 37
See application file for complete search history.

(56) References Cited

U.S. PATENT DOCUMENTS

| | | | | |
|---|---|---|---|---|
| 676,226 | A * | 6/1901 | Fellows | ................... B23F 21/10 |
| | | | | 407/28 |
| 1,833,255 | A * | 11/1931 | Miller | ..................... B23F 5/202 |
| | | | | 407/28 |

(Continued)

FOREIGN PATENT DOCUMENTS

| | | |
|---|---|---|
| JP | 2005-335061 | 12/2005 |
| JP | 2012-051049 | 3/2012 |

*Primary Examiner* — Daniel Howell
*Assistant Examiner* — Yasir Diab
(74) *Attorney, Agent, or Firm* — Oblon, McClelland, Maier & Neustadt, L.L.P.

(57) ABSTRACT

A gear machining device is provided which can machine an accurate gear by a cutting process by synchronously rotating a machining tool and a workpiece at a high speed. A machining tool includes roughing cutting teeth for roughing bottom lands and right and left side faces of teeth of a gear, right side face finishing cutting teeth for finishing the right side faces of the teeth, and left side face finishing cutting teeth for finishing the left side faces of the teeth. The cutting teeth thus cut different parts of the teeth of the gear. This can reduce cutting resistance and suppress self-vibration during the cutting process, thereby improving tooth trace accuracy of the gear.

12 Claims, 8 Drawing Sheets

(51) Int. Cl.
    *B23F 21/06*    (2006.01)
    *B23F 1/04*    (2006.01)
(52) U.S. Cl.
    CPC ............... *Y10T 409/105088* (2015.01); *Y10T 409/105247* (2015.01); *Y10T 409/105565* (2015.01)

(56) References Cited

U.S. PATENT DOCUMENTS

| | | | | |
|---|---|---|---|---|
| 2,284,636 | A | * | 6/1942 | Carlsen ................... B23F 9/003 409/25 |
| 2,346,807 | A | * | 4/1944 | Wildhaber ................ B23F 9/10 409/26 |
| 2,354,670 | A | * | 8/1944 | Drummond ............ B23F 19/06 409/31 |
| 2,392,803 | A | * | 1/1946 | Austin ................... B23F 19/06 409/33 |
| 2,646,611 | A | * | 7/1953 | Bauer ................... B23F 21/146 407/29 |
| 2005/0266774 | A1 | | 12/2005 | Baldeck |
| 2009/0028655 | A1 | * | 1/2009 | Ribbeck ................ B23F 17/003 409/27 |
| 2010/0111629 | A1 | * | 5/2010 | Durr ........................ B23F 9/10 409/27 |
| 2012/0057944 | A1 | | 3/2012 | Nagata |
| 2012/0148360 | A1 | * | 6/2012 | Heinemann ............ B23F 5/163 409/12 |
| 2015/0043985 | A1 | | 2/2015 | Otani et al. |

* cited by examiner

Section A-A

GEAR MACHINING DEVICE

INCORPORATION BY REFERENCE

The disclosure of Japanese Patent Application No. 2014-103598 filed on May 19, 2014 including the specification, drawings and abstract, is incorporated herein by reference in its entirety.

BACKGROUND OF THE INVENTION

1. Field of the Invention

The present invention relates to gear machining devices that machine a gear by a cutting process by synchronously rotating a machining tool and a workpiece at a high speed.

2. Description of the Related Art

Conventionally, one effective method to machine internal teeth and external teeth in the case of machining a gear by a cutting process using a machine tool such as a machining center is a machining method described in Japanese Patent Application Publication No. 2012-51049 (JP 2012-51049 A). This machining method is a machining method for creating teeth by a cutting process by synchronously rotating at a high speed a machining tool that is rotatable about a rotational axis, a cutter having, e.g., a plurality of cutting teeth, and a workpiece that is rotatable about a rotational axis tilted at a predetermined angle with respect to the rotational axis of the machining tool and feeding the machining tool in the direction of the rotation axis of the workpiece.

In this machining method, however, cutting resistance tends to be high since the plurality of cutting teeth contact the workpiece at the same time. Self-excited vibration therefore tends to occur during the cutting process, which may reduce tooth trace accuracy (tooth trace deviation) of the gear. Reducing the diameter of the machining tool can reduce the number of cutting teeth that contact the workpiece at the same time, but may reduce rigidity of the machining tool.

Japanese Patent Application Publication No. 2005-335061 (JP 2005-335061 A) describes a machining method in which a machining tool is moved in a direction of a feed path along the surface of a tooth of a workpiece. In this machining method, the machining tool is moved with respect to the workpiece at a varying feed speed in the direction of the feed path. According to this machining method, intervals between fine scratches that are made during machining are irregular along the surface of the tooth. Therefore, noise in a meshing part of the gear, namely self-excited vibration, can therefore be reduced.

In the machining method of JP 2005-335061 A, however, the feed speed of the machining tool with respect to the workpiece needs to be varied. This makes feed control complicated, making it difficult to improve accuracy of the tooth profile of the gear.

SUMMARY OF THE INVENTION

The present invention was developed in view of the above circumstances, and it is an object of the present invention to provide a gear machining device capable of machining an accurate gear by a cutting process by synchronously rotating a machining tool and a workpiece at a high speed.

A gear machining device according to an aspect of the present invention includes: a machining tool having a rotational axis tilted with respect to a rotational axis of a workpiece, in which the gear machining device machines a gear by relatively feeding the machining tool in a direction of the rotational axis of the workpiece while rotating the machining tool synchronously with the workpiece, and the machining tool includes at least two kinds of cutting teeth machining different ones of side faces and a bottom land of a tooth of the gear. Since each cutting tooth cuts part of the gear, cutting resistance can be reduced, and self-excited vibration during the cutting process can be suppressed, whereby tooth trace accuracy (tooth trace deviation) of the gear can be improved.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

First, the mechanical configuration of a gear machining device according to an embodiment of the present invention will be described. A five-axis machining center will be described as an example of a gear machining device 1 with reference to FIG. 1. The gear machining device 1 is a device having as drive axes three linear axes (X-axis, Y-axis, and Z-axis) perpendicular to each other and two rotational axes (A-axis and C-axis).

Figure 1:
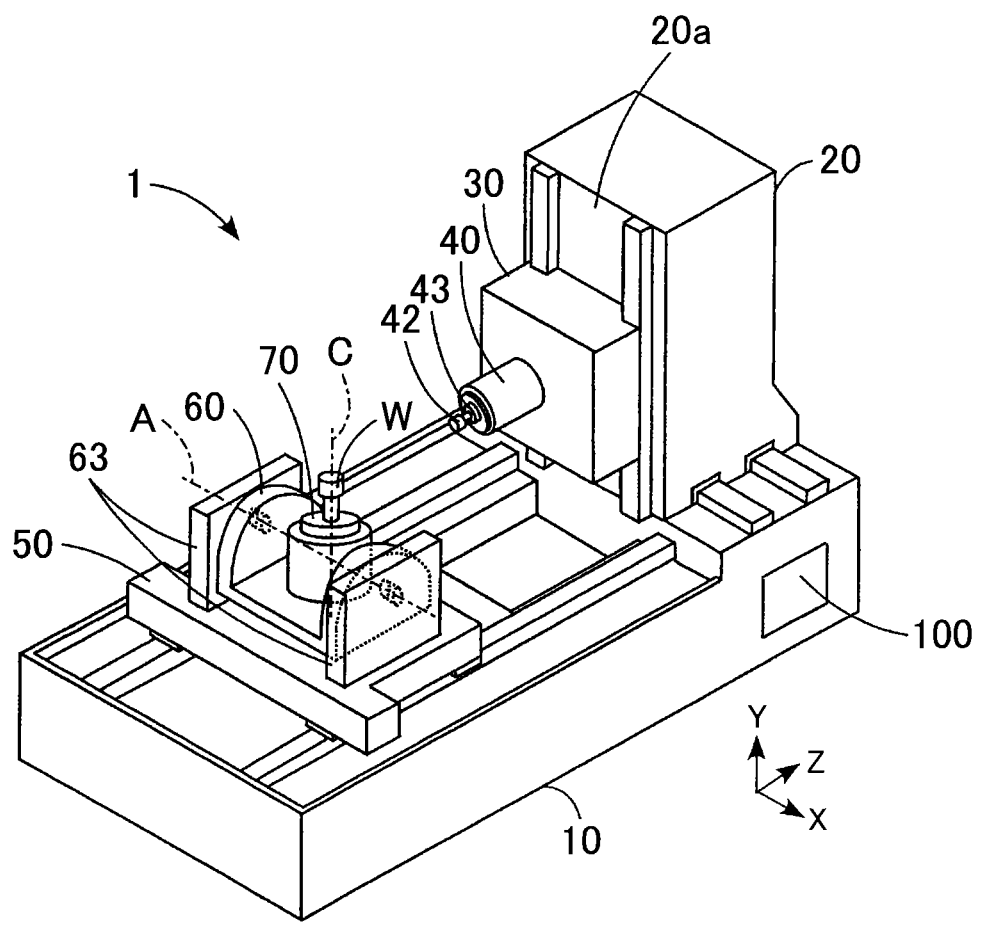
FIG. 1 is a perspective view showing the overall configuration of a gear machining device according to an embodiment of the present invention.

As shown in FIG. 1, the gear machining device 1 includes a bed 10, a column 20, a saddle 30, a spindle 40, a table 50, a tilt table 60, a turn table 70, a control device 100, etc. Although not shown in the figure, a known automatic tool changer is disposed next to the bed 10.

The bed 10 is substantially in the shape of a cuboid and is placed on a floor. The column 20 is disposed on the upper surface of the bed 10 so as to be movable in an X-axis direction with respect to the bed 10. The saddle 30 is disposed on one of the side surfaces of the column 20 which is parallel to the X-axis, namely on a side surface (sliding surface) 20a of the column 20, so as to be movable in a Y-axis direction with respect to the column 20.

The spindle 40 is disposed so as to be rotatable with respect to the saddle 30, and supports a machining tool 42. The machining tool 42 is held by a tool holder 43 and fixed to the distal end of the spindle 40, and rotates according to the rotation of the spindle 40. The machining tool 42 moves in the X- and Y-axis directions with respect to the bed 10 according to the movement of the column 20 and the saddle 30. In the present embodiment, the machining tool 42 is a hob having a plurality of cutting teeth.

The table 50 is disposed on the upper surface of the bed 10 so as to be movable in a Z-axis direction with respect to the bed 10. Tilt table support portions 63 are disposed on the upper surface of the table 50 to support the tilt table 60. The tilt table 60 is disposed between the tilt table support portions 63 and can rotate (swing) about the A-axis extending in the horizontal direction. The turn table 70 is disposed on the tilt table 60 and can rotate about the C-axis perpendicular to the A-axis. A workpiece W is held on the turn table 70.

The control device 100 controls movement of the column 20, the saddle 30, the spindle 40, the table 50, the tilt table 60, and the turn table 70 to move the workpiece W and the machining tool 42 relative to each other in the X-, Z-, and Y-axis directions and about the A- and C-axes, thereby performing a cutting process of the workpiece W.

Figure 6:
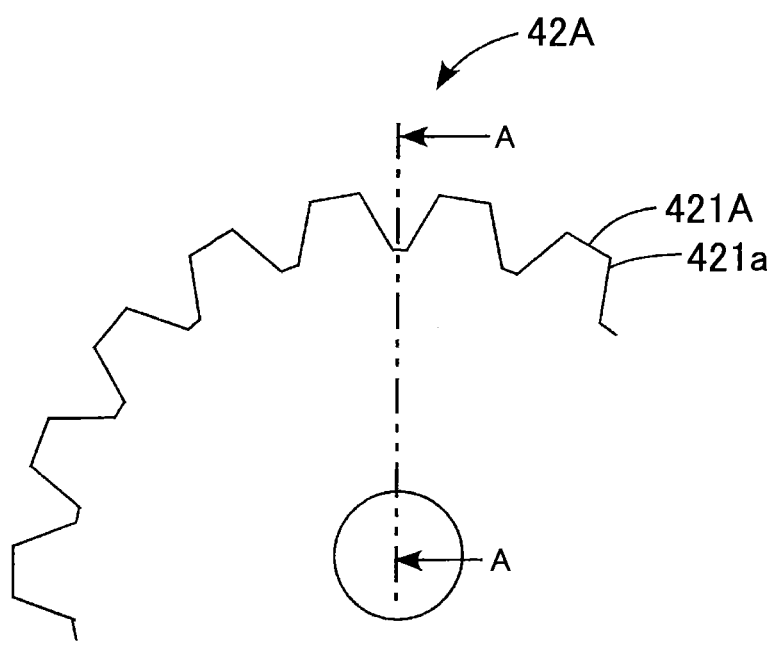
FIG. 6 is a schematic view of a commonly used machining tool as viewed in an axial direction.

The gear machining device 1 cut gear teeth into the workpiece W by synchronously rotating the machining tool 42 and the workpiece W at a high speed and feeding the machining tool 42 in the direction of the rotational axis of the workpiece W. A machining tool 42A in which cutting teeth 421A having the same profile are arranged at equal pitch is commonly used in this cutting process. As shown in FIG. 8, the portion of the edge of the cutting tooth 421A of the machining tool 42A (see FIGS. 6 and 7) which contacts the workpiece W varies depending on its circumferential position in the machining tool 42A. That is, there are the cases where substantially the entire edge of the cutting tooth 421A contacts the workpiece W (the region A surrounded by an alternate long and short dashed line) and where the edge near the tip end of the cutting tooth 421A contacts the workpiece W (the region B surrounded by a long dashed double-short dashed line).

Figure 9:
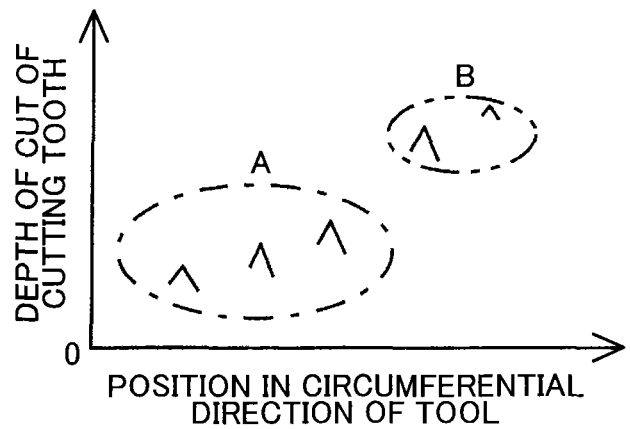
FIG. 9 is a diagram showing the relation between the depth of cut of the cutting teeth of the machining tool shown in FIG. 6 into the workpiece and the position in the circumferential direction of the tool.
Figure 10:
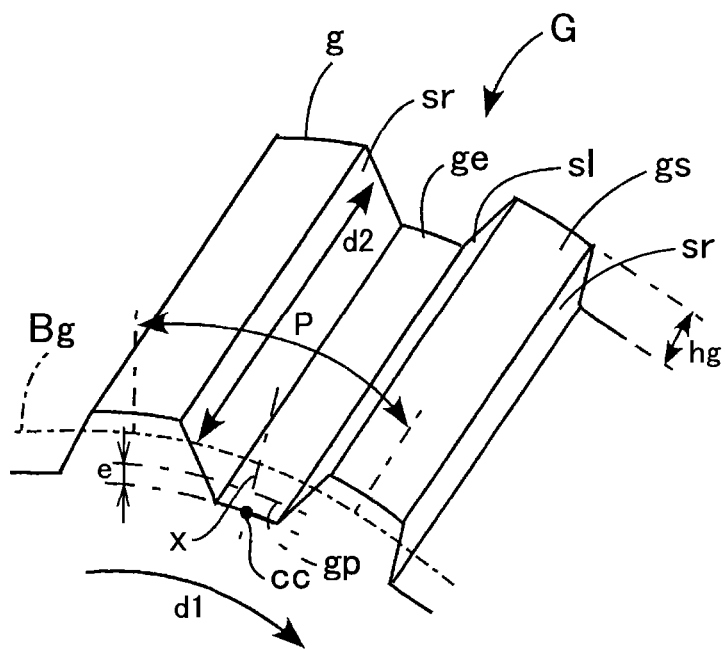
FIG. 10 is a view illustrating a tooth trace deviation as a deviation of the tooth profile of a gear.

As shown in FIG. 9, the depth of cut of the cutting tooth 421A of the machining tool 42A into the workpiece W is greater in the case where the edge near the tip end of the cutting tooth 421A contacts the workpiece W (the region B surrounded by the long dashed double-short dashed line) than in the case where substantially the entire edge of the cutting tooth 421A contacts the workpiece W (the region A surrounded by the alternate long and short dashed line). That is, cutting resistance is higher in the case where the edge near the tip end of the cutting tooth 421A contacts the workpiece W. Accordingly, in the case where the edge near the tip end of the cutting tooth 421A contacts the workpiece W, self-excited vibration tends to occur during the cutting process, which may affect tooth trace accuracy (tooth trace deviation) of the gear G. As shown in FIG. 10, the tooth trace accuracy is one of the degree of deviation between an ideal tooth flank and an actual tooth flank (tooth trace deviation) as measured with a measuring apparatus that measures displacements of both side faces (both tooth flanks) sr, sl in a circumferential direction d1 of a tooth g of a gear G, that is, displacements of the side faces sr, sl in a direction perpendicular to each side face. Specifically, the tooth trace accuracy is measured by moving a stylus of the measuring apparatus in an axial direction d2 of the gear G.

Figure 7:
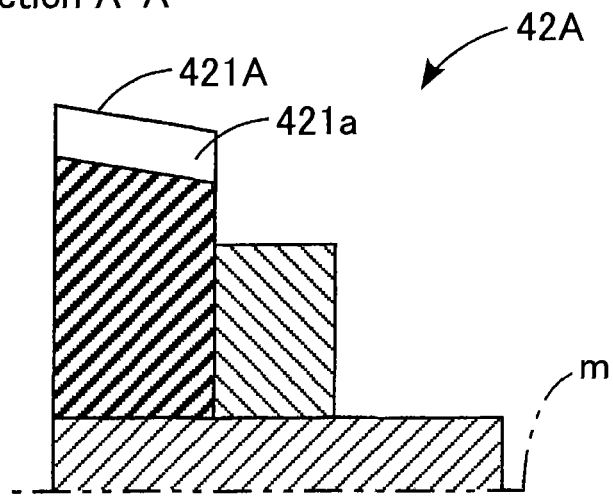
FIG. 7 is an A-A sectional view of the machining tool shown in FIG. 6, as viewed in a direction perpendicular to the axial direction.
Figure 8:
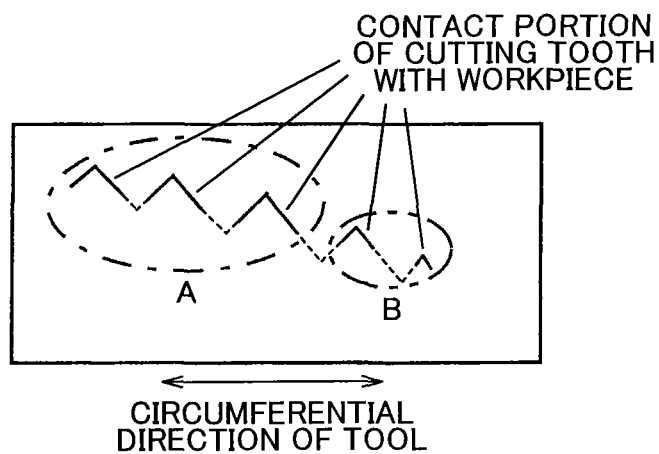
FIG. 8 is a diagram showing the relation between the contact position of cutting teeth of the machining tool shown in FIG. 6 with a workpiece and the position in a circumferential direction of the tool.

As shown in FIG. 7, a side face 421a of the cutting tooth 421A of the machining tool 42A is shaped to have a small tilt angle with respect to a rotational axis m of the machining tool 42A. That is, there is small clearance between the workpiece W and the side face 421a during the cutting process. Accordingly, if deformed due to the cutting resistance, the cutting teeth 421A tend to interfere with the workpiece W. This may further reduce the tooth trace accuracy of the gear.

Figure 2:
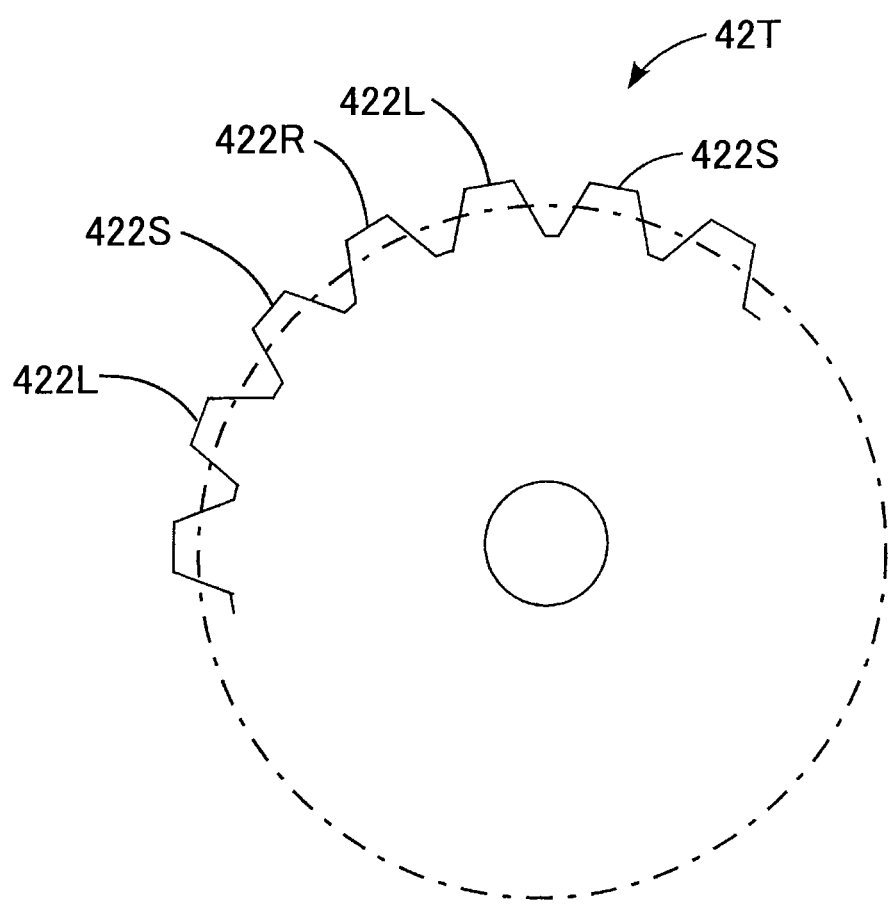
FIG. 2 is a schematic view of a machining tool for use in the gear machining device of the embodiment, as viewed in an axial direction.

As a solution to this, as shown in FIG. 2, the cutting process with the gear machining device 1 of the present embodiment is performed by using a machining tool 42T having in its circumferential direction a plurality of sets of multiple kinds (in the present embodiment, three kinds) of cutting teeth 422S, 422R, 422L that machine different parts of the tooth g of the gear G. Since each cutting tooth 422S, 422R, 422L cuts a part of a tooth space between the teeth g of the gear G cutting resistance can be reduced, and self-excited vibration during the cutting process can be suppressed, whereby the tooth trace accuracy (tooth trace deviation) of the gear G can be improved. Since the machining tool 42T has the same numbers of cutting teeth 422S, 422R, 422L, the cutting teeth 422S, 422R, 422L can uniformly cut the workpiece W.

Specifically, the cutting teeth 422S are roughing cutting teeth for roughing bottoms ge of the teeth g of the gear G and the right and left side faces sr, sl in the circumferential direction d1 of the teeth g shown in FIG. 10. The cutting teeth 422R are right side face finishing cutting teeth for finishing the right side faces sr of the teeth g. The cutting teeth 422L are left side face finishing cutting teeth for finishing the left side face sl of the teeth g. As used herein, "right" corresponds to the clockwise direction and "left" corresponds to the counterclockwise direction in FIGS. 2 and 3 showing the machining tool 42T and FIG. 10 showing the gear G.

Figure 3:
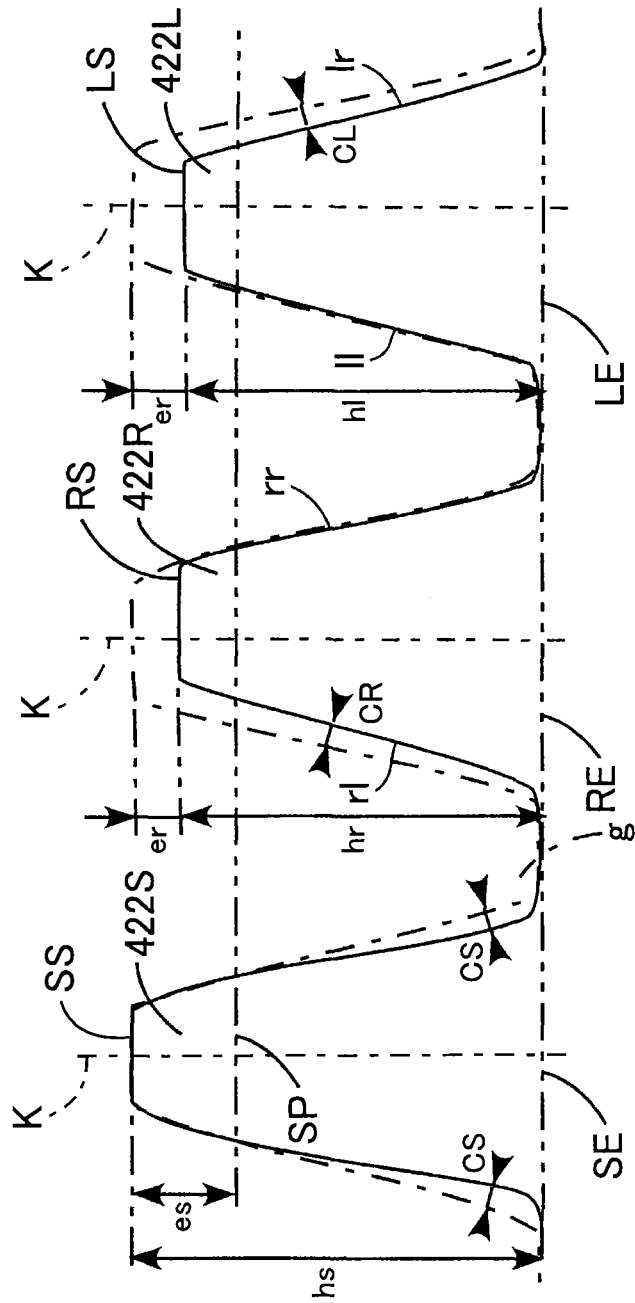
FIG. 3 is an enlarged view of cutting teeth of the machining tool shown in FIG. 2.

As shown in FIG. 3, the height hs from a top SS to a bottom SE of each roughing cutting tooth 422S is the same as the depth distance hg from a top land gs to the bottom land ge of the tooth g of the gear G shown in FIG. 10. Each roughing cutting tooth 422S has the following outer edge profile from the top SS to the bottom SE as viewed in the axial direction of the machining tool 42T. The outer edge profile of the portion from the top SS to an intermediate position, namely a position SP separated from the top SS by a distance es, of the roughing cutting tooth 422S is the same as that of the portion from the bottom land ge of the tooth g of the gear G to a position gp separated from the bottom land ge by clearance e. The distance es from the top SS to the position SP is the same as the clearance e of the gear G (the distance from a root circle of the gear G to a tip circle of a gear that meshes with the gear G).

The portion from the intermediate position SP to the bottom SE of the roughing cutting tooth 422S has such an outer edge profile that this portion is separated from the portions from the position gp to the top land gs of the teeth g of the gear G by predetermined clearance CS (FIG. 3). For example, this clearance CS is set so that the clearance CS gradually increases from the intermediate position SP toward the bottom SE and that the maximum value of the clearance CS is the same as the finishing stock. The portion from the position gp to the top land gs of the tooth g of the gear G is the contact portion of the gear G with a mating gear.

The height hr from a top RS to a bottom RE of each right side face finishing cutting tooth 422R is lower than the height hs from the top SS to the bottom SE of each roughing cutting tooth 422S. Specifically, the height hr is lower than the height hs by a relief dimension er that is slightly smaller than the clearance e of the gear G. Each right side face finishing cutting tooth 422R has the following outer edge profile from the top RS to the bottom RE as viewed in the axial direction of the machining tool 42T. Each right side face finishing cutting tooth 422R is formed so that the distance from a reference phase line K of the right side face finishing cutting tooth 422R to a left side face rl of the right side face finishing cutting tooth 422R is smaller than that from the reference phase line K to a right side face rr of the right side face finishing cutting tooth 422R. As used herein, the "reference phase line K of the cutting tooth" refers to a straight line that matches a straight line x in the radial direction which passes through a center cc in the circumferential direction of the bottom land ge of the gear G in the case where an imaginary cutting tooth is located right in the middle between the teeth g of the gear G being machined, as shown in FIG. 10.

Specifically, the right side face rr of the right side face finishing cutting tooth 422R has the same profile as the right side face sr of the tooth g of the gear G. The left side face rl of the right side face finishing cutting tooth 422R is formed such that the left side face rl is separated from the left side face sl of the tooth g of the gear G by predetermined clearance CR. The thickness of the right side face finishing cutting tooth 422R is thus smaller than that of the roughing cutting tooth 422S.

The height hl from a top LS to a bottom LE of each left side face finishing cutting tooth 422L is the same as the height hr from the top RS to the bottom RE of each right side face finishing cutting tooth 422R. Each left side face finishing cutting tooth 422L has the following outer edge profile from the top LS to the bottom LE as viewed in the axial direction of the machining tool 42T. Each left side face finishing cutting tooth 422L is formed so that the distance from the reference phase line K of the left side face finishing cutting tooth 422L to a right side face lr of the left side face finishing cutting tooth 422L is smaller than that from the reference phase line K to a left side face ll of the left side face finishing cutting tooth 422L.

Specifically, the left side face ll of the left side face finishing cutting tooth 422L has the same profile as the left side face sl of the tooth g of the gear G shown in FIG. 10. The right side face lr of the left side face finishing cutting tooth 422L is formed such that the right side face lr is separated from the right side face sr of the tooth g of the gear G by predetermined clearance CL. That is, the outer edge profile from the top LS to the bottom LE of the left side face finishing cutting tooth 422L is a mirror image of the outer edge profile from the top RS to the bottom RE of the right side face finishing cutting tooth 422R.

In the cutting process with this machining tool 42T, the top SS of each roughing cutting tooth 422S having a greater height and a smaller thickness in the dedendum first mainly contacts the workpiece W to cut the tooth space between the teeth g. Subsequently, the right side face rr of each right side face finishing cutting tooth 422R having a lower height and a larger thickness in the dedendum and the left side face ll of each left side face finishing cutting tooth 422L having a lower height and a larger thickness in the dedendum contact the part of the workpiece W which has been cut by the roughing cutting tooth 422S, thereby cutting the right side face sr and the left side face sl of the teeth g.

Since each cutting tooth 422S, 422R, 422L partially cut the tooth g of the gear G, the use of the machining tool 42T of the present embodiment significantly reduces the cutting resistance in the cutting process of the workpiece W as compared to the commonly used machining tool 42A. This suppresses self-excited vibration during the cutting process and suppresses deformation of the cutting teeth 422S, 422R, 422L, preventing interference of the cutting teeth 422S, 422R, 422L with the workpiece W. The tooth trace accuracy of the gear is therefore significantly improved.

Figure 4:
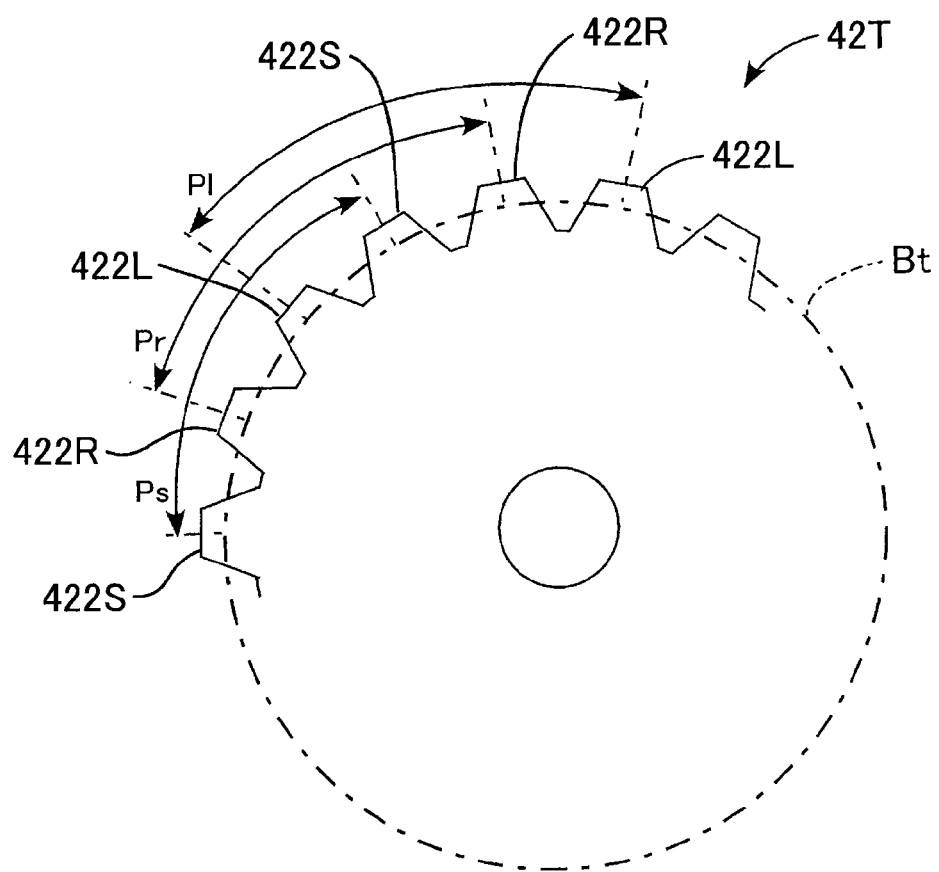
FIG. 4 is a view illustrating the pitch of the cutting teeth of the machining tool shown in FIG. 2.

The pitches (intervals in the circumferential direction) of the roughing cutting teeth 422S, the right side face finishing cutting teeth 422R, and the left side face finishing cutting teeth 422L of the machining tool 42T will be described below. As shown in FIG. 4, the machining tool 42T is produced so that the pitch of each kind of cutting teeth, namely each of the pitch Ps of the roughing cutting teeth 422S, the pitch Pr of the right side face finishing cutting teeth 422R, and the pitch Pl of the left side face finishing cutting teeth 422L, is equal to an integer multiple of the pitch P of the teeth g of the gear G shown in FIG. 10, where the integer is 2 or more. As used herein, the "pitch Ps, Pr, Pl, P" refers to the distance between adjacent ones of the cutting teeth 422S, 422R, 422L or between adjacent ones of the teeth g on a reference circle Bt shown in FIGS. 4 and 10.

The machining tool 42T has the sets of the roughing cutting tooth 422S, the right side face finishing cutting tooth 422R, and the left side face finishing cutting tooth 422L in the circumferential direction. The pitch Ps of the roughing cutting teeth 422S, the pitch Pr of the right side face finishing cutting teeth 422R, and the pitch Pl of the left side face finishing cutting teeth 422L are therefore set to three times the pitch P of the teeth g of the gear G. The machining tool 42T is produced so that the pitch Ps of the roughing cutting teeth 422S, the pitch Pr of the right side face finishing cutting teeth 422R, and the pitch Pl of the left side face finishing cutting teeth 422L are equal to each other along the entire circumference. This can stabilize load on the cutting teeth 422S, 422R, 422L in the cutting process.

The number of roughing cutting teeth 422S, right side face finishing cutting teeth 422R, and left side face finishing cutting teeth 422L of the machining tool 42T will be described below. It is herein assumed that the number of teeth g along the entire circumference of the gear G, that is, the total number Ng of teeth, has already been set. In the machining tool 42T, the total number Nt of roughing cutting teeth 422S, right side face finishing cutting teeth 422R, and left side face finishing cutting teeth 422L is set so that the greatest common divisor of the total number Nt of cutting teeth 422S, 422R, 422L and the total number Ng of teeth of the gear G is an integer larger than 1. For example, if the same roughing cutting tooth 422S can cut the same tooth space, variation in accuracy of the roughing cutting teeth 422S can be prevented from affecting the tooth trace accuracy (tooth trace deviation) of all the teeth g of the gear G. The same applies to the right side face finishing cutting teeth 422R and the left side face finishing cutting teeth 422L.

If the greatest common divisor is 1, the number of revolutions of the machining tool 42T until the first roughing cutting tooth 422S having cut the first tooth g cuts the first tooth g again is equal to the product (Nt·Ng) of the total number Nt of cutting teeth 422S, 422R, 422L of the machining tool 42T and the total number Ng of the teeth g of the gear G. This product is a very large value, making it difficult to improve the tooth trace accuracy (tooth trace deviation) of the gear G. Setting the total number Nt of cutting teeth 422S, 422R, 422L so that the greatest common divisor is an integer larger than 1 can reduce the tooth trace deviation of the gear G. The same applies to the right side face finishing cutting teeth 422R and the left side face finishing cutting teeth 422L.

Moreover, the total number Nt of cutting teeth 422S, 422R, 422L is set so that the quotient when the least common multiple of the total number Nt of cutting teeth 422S, 422R, 422L and the total number Ng of teeth of the gear G is divided by the total number Nt of cutting teeth 422S, 422R, 422L is an integer larger than 1 and equal to or smaller than 10. This quotient represents the number of revolutions of the machining tool 42T until the first roughing cutting tooth 422S having cut the first tooth g cuts the first tooth g again. The same applies to the right side face finishing cutting teeth 422R and the left side face finishing cutting teeth 422L.

Accordingly, if the quotient is 1, the total number Nt of cutting teeth 422S, 422R, 422L is the same as the total number Ng of teeth of the gear G. In this case, machining of internal teeth cannot be performed. That is, a skiving process cannot be performed. Setting the total number Nt of cutting teeth 422S, 422R, 422L so that the quotient is an integer larger than 1 makes it possible to perform machining of internal teeth. Moreover, setting the total number Nt of cutting teeth 422S, 422R, 422L so that the quotient is an integer equal to or smaller than 10 can improve the tooth trace accuracy (tooth trace deviation). In this case, the number of roughing cutting teeth 422S, the number of right side face finishing cutting teeth 422R, and the number of left side face finishing cutting teeth 422L are given by the following formulae Nt·P/Ps, Nt·P/Pr, and Nt·P/Pl, respectively.

Specifically, in the case where the pitch Ps of the roughing cutting teeth 422S, the pitch Pr of the right side face finishing cutting teeth 422R, and the pitch Pl of the left side face finishing cutting teeth 422L are three times the pitch P of the teeth g, the total number Ng of teeth g of the gear G needs to be a value indivisible by 3 and the total number Nt of cutting teeth 422S, 422R, 422L needs to be a value divisible by 3 in order to prevent the gear G from having any tooth g for which cutting of the bottom land and side faces has not been completed.

For example, if the total number Ng of teeth g of the gear G is set to 100 and the total number Nt of cutting teeth 422S, 422R, 422L is set to 60, the least common multiple of 60 (total number Nt of cutting teeth 422S, 422R, 422L) and 100 (total number Ng of teeth g) is 300, and the quotient when 300 (least common multiple) is divided by 60 (total number Nt of cutting teeth 422S, 422R, 422L) is 5, which is an integer larger than 1 and equal to or smaller than 10. In this case, each of the number of roughing cutting teeth 422S, the number of right side face finishing cutting teeth 422R, and the number of left side face finishing cutting teeth 422L is 20.

If the total number Ng of teeth g of the gear G is set to 100 and the total number Nt of cutting teeth 422S, 422R, 422L is set to 90, the least common multiple of 90 (total number Nt of cutting teeth 422S, 422R, 422L) and 100 (total number Ng of teeth g) is 900, and the quotient when 900 (least common multiple) is divided by 90 (total number Nt of cutting teeth 422S, 422R, 422L) is 10, which is an integer larger than 1 and equal to or smaller than 10. In this case, each of the number of roughing cutting teeth 422S, the number of right side face finishing cutting teeth 422R, and the number of left side face finishing cutting teeth 422L is 30.

If the total number Ng of teeth g of the gear G is set to 100 and the total number Nt of cutting teeth 422S, 422R, 422L is set to 120, the least common multiple of 120 (total number Nt of cutting teeth 422S, 422R, 422L) and 100 (total number Ng of teeth g) is 600, and the quotient when 600 (least common multiple) is divided by 120 (total number Nt of cutting teeth 422S, 422R, 422L) is 5, which is an integer larger than 1 and equal to or smaller than 10. In this case, each of the number of roughing cutting teeth 422S, the number of right side face finishing cutting teeth 422R, and the number of left side face finishing cutting teeth 422L is 40, and the diameter of the machining tool 42T is larger than that of the gear G. This machining tool 42T is therefore used only for external gears G.

On the other hand, if the total number Ng of teeth g of the gear G is set to 100 and the total number Nt of cutting teeth 422S, 422R, 422L is set to 45, the least common multiple of 45 (total number Nt of cutting teeth 422S, 422R, 422L) and 100 (total number Ng of teeth g) is 900, and the quotient when 900 (least common multiple) is divided by 45 (total number Nt of cutting teeth 422S, 422R, 422L) is 20, which is an integer larger than 10. Accordingly, the machining tool 42T in which the total number Nt of cutting teeth 422S, 422R, 422L is 45 does not improve the tooth trace accuracy (tooth trace deviation) so much.

Based on the above description, the total number Nt of cutting teeth 422S, 422R, 422L is set to 60, 75, or 150. In the case where the total number Nt of cutting teeth 422S, 422R, 422L is 60, the first roughing cutting tooth 422S having cut the first tooth g cuts the first tooth g again for every five revolutions of the machining tool 42T. In the case where the total number Nt of cutting teeth 422S, 422R, 422L is 75, the first roughing cutting tooth 422S having cut the first tooth g cuts the first tooth g again for every four revolutions of the machining tool 42T. In the case where the total number Nt of cutting teeth 422S, 422R, 422L is 150, the first roughing cutting tooth 422S having cut the first tooth g cuts the first tooth g again for every two revolutions of the machining tool 42T. The same applies to the right side face finishing cutting teeth 422R and the left side face finishing cutting teeth 422L.

As a result, the following equation (1) can be obtained.

$$Nt = Ng \cdot s/t \quad (1)$$

In the equation (1), "Nt" represents the total number of cutting teeth 422S, 422R, 422L, "Ng" represents the total number of teeth g of the gear G, "s" represents the pitch Ps, Pr, Pl of the cutting teeth 422S, 422R, 422L divided by the pitch P of the teeth g, and "t" represents the quotient when the least common multiple of the total number Nt of cutting teeth 422S, 422R, 422L and the total number of teeth g of the gear G is divided by the total number Nt of cutting teeth 422S, 422R, 422L.

In order to ensure rigidity of the machining tool 42T, a tool length L (the distance from the distal end face of the spindle 40 to the tip end face of the machining tool 42T) divided by a tool diameter d (L/d) is set to about 1. The tool diameter d can be obtained from the relation between a common module and the total number Nt of the roughing cutting teeth 422S, the right side face finishing cutting teeth 422R, and the left side face finishing cutting teeth 422L. The total number Nt of cutting teeth 422S, 422R, 422L is obtained by substituting predetermined numerical values in the equation (1), and Nt·P/Ps, Nt·P/Pr, and Nt·P/Pl, namely the number of roughing cutting teeth 422S, the number of right side face finishing cutting teeth 422R, and the number of left side face finishing cutting teeth 422L, are obtained. The final machining tool 42T is thus produced.

In the above embodiment, the machining tool 42T has in its circumferential direction a plurality of sets of the roughing cutting tooth 422S, the right side face finishing cutting tooth 422R, and the left side face finishing cutting tooth 422L. A machining tool according to another embodiment may have in its circumferential direction a plurality of sets of the right side face finishing cutting tooth 422R and the left side face finishing cutting tooth 422L or may have in its circumferential direction a plurality of sets of the roughing cutting tooth 422S and a common finishing cutting tooth for the right and left side faces of the teeth g. Alternatively, the machining tool may have these cutting teeth and other kind of cutting teeth.

Figure 5:
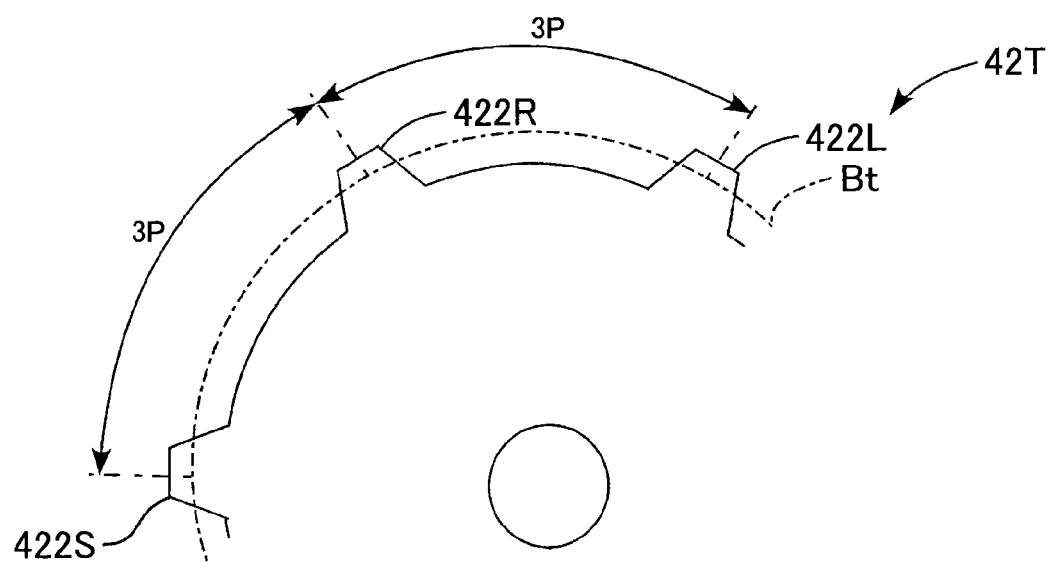
FIG. 5 is a schematic view of a machining tool of another embodiment for use in the gear machining device of the embodiment, as viewed in an axial direction.

In the machining tool 42T of the above embodiment, the roughing cutting teeth 422S, the right side face finishing cutting teeth 422R, and the left side face finishing cutting teeth 422L are arranged at the fixed pitch P. For example, as shown in FIG. 5, the roughing cutting teeth 422S, the right side face finishing cutting teeth 422R, and the left side face finishing cutting teeth 422L may alternatively be arranged at pitch P3 that is three times the pitch P. That is, the machining tool may have regions with no cutting teeth.

This can reduce the number of roughing cutting teeth 422S, right side face finishing cutting teeth 422R, or left side face finishing cutting teeth 422L that contact the workpiece W at the same time during the cutting process. Accordingly, the cutting resistance can further be reduced, and self-excited vibration during the cutting process can be suppressed, whereby the tooth trace accuracy (tooth trace deviation) of the gear G can further be improved. In the machining tool 42T, the sets of one roughing cutting tooth 422S, one right side face finishing cutting tooth 422R, and one left side face finishing cutting tooth 422L are arranged in the circumferential direction. However, sets of two or more roughing cutting teeth 422S, two or more right side face finishing cutting teeth 422R, and two or more left side face finishing cutting teeth 422L may be arranged in the circumferential direction.

In the above embodiment, the gear machining device 1 as a five-axis machining center can rotate the workpiece W about the A-axis. However, the five-axis machining center may be a vertical machining center that can rotate the machining tool 42 about the axis A. Although the present invention is described with respect to the case where the invention is applied to a machining center, the present invention is similarly applicable to a dedicated machine for machining a gear. Although the present invention is described with respect to machining of external gears, the present invention is similarly applicable to machining of internal gears.

What is claimed is:

1. A gear machining device, comprising:
a machining tool having a rotational axis tilted with respect to a rotational axis of a workpiece, wherein,
the gear machining device machines a gear by relatively feeding the machining tool in a direction of the rotational axis of the workpiece while rotating the machining tool synchronously with the workpiece,
the machining tool includes a rough cutting tooth, a right side face finishing cutting tooth, and a left side face finishing cutting tooth,
the roughing cutting tooth roughly machines a bottom land, a right side face, and a left side face of the tooth of the gear,
the right side face finishing cutting tooth finishes the right side face of the tooth of the gear, and
the left side face finishing cutting tooth finishes the left side face of the tooth of the gear.

2. The gear machining device according to claim 1, wherein,
the right side face finishing cutting tooth in which a distance from a reference phase line of the right side face finishing cutting tooth to a left side face of the right side face finishing cutting tooth is smaller than a distance from the reference phase line to a right side face of the right side face finishing cutting tooth, and
the left side face finishing cutting tooth in which a distance from a reference phase line of the left side face finishing cutting tooth to a right side face of the left side face finishing cutting tooth is smaller than a distance from the reference phase line to a left side face of the left side face finishing cutting tooth.

3. The gear machining device according to claim 2, wherein,
the roughing cutting tooth has a greater height than the right side face finishing cutting tooth and the left side face finishing cutting tooth, and
the roughing cutting tooth has a smaller thickness than the right side face finishing cutting tooth and the left side face finishing cutting tooth.

4. The gear machining device according to claim 1, wherein,
the machining tool has in the circumferential direction a plurality of sets of the right side face finishing cutting tooth, the left side face finishing cutting tooth, and the roughing cutting tooth that are arranged next to each other.

5. The gear machining device according to claim 1, wherein,
the roughing cutting tooth has a greater height and a smaller thickness than either of the right side face finishing cutting tooth and the left side face finishing cutting tooth.

6. The gear machining device according to claim 1, wherein,
the machining tool includes the same numbers of the plurality of kinds of cutting teeth.

7. The gear machining device according to claim 2, wherein,
the machining tool includes the same numbers of the plurality of kinds of cutting teeth.

8. The gear machining device according to claim 3, wherein,
the machining tool includes the same numbers of the plurality of kinds of cutting teeth.

9. The gear machining device according to claim 4, wherein,
the machining tool includes the same numbers of the plurality of kinds of cutting teeth.

10. The gear machining device according to claim 5, wherein,
the machining tool includes the same numbers of the plurality of kinds of cutting teeth.

11. The gear machining device according to claim 6, wherein,
in the machining tool, an interval between the cutting teeth of the same kind is an integer multiple of an interval between the teeth of the gear, where the integer is 2 or more.

12. The gear machining device according to claim 3, wherein,
in the right side face finishing cutting tooth, the distance from the reference phase line of the right side face finishing cutting tooth to the left side face of the right side face finishing cutting tooth is smaller than a distance from a reference phase line of the roughing cutting tooth to a left side face of the roughing cutting tooth, so that the left side face of the right side face finishing cutting tooth does not finish the left side face of the tooth of the gear, wherein, in the left side face finishing cutting tooth, the distance from the reference phase line of the left side face finishing cutting tooth to the right side face of the left side face finishing cutting tooth is smaller than a distance from the reference phase line of the roughing cutting tooth to a right side face of the roughing cutting tooth, so that the right side face of the left side face finishing cutting tooth does not finish the right side face of the tooth of the gear.

* * * * *